(12) United States Patent
Lerner et al.

(10) Patent No.: US 8,367,260 B2
(45) Date of Patent: Feb. 5, 2013

(54) REMEDIAL START METHOD IN A FUEL CELL

(75) Inventors: Seth E. Lerner, Honeoye Falls, NY (US); Akbar Chowdhury, Pittsford, NY (US); Steven G. Goebel, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 679 days.

(21) Appl. No.: 12/575,651

(22) Filed: Oct. 8, 2009

(65) Prior Publication Data

US 2011/0086282 A1   Apr. 14, 2011

(51) Int. Cl.
*H01M 8/04* (2006.01)
(52) U.S. Cl. .................... 429/429; 429/432; 429/446
(58) Field of Classification Search .................. 429/429, 429/430, 432, 446
See application file for complete search history.

(56) References Cited

U.S. PATENT DOCUMENTS

| | | | |
|---|---|---|---|
| 7,479,336 B2 * | 1/2009 | Willimowski et al. | 429/430 X |
| 7,862,948 B2 * | 1/2011 | Lienkamp et al. | 429/432 |
| 8,057,941 B2 * | 11/2011 | Sienkowski et al. | 429/432 X |
| 2009/0081491 A1 | 3/2009 | Arthur et al. | |
| 2010/0143813 A1 * | 6/2010 | Goebel et al. | 429/429 |
| 2011/0086284 A1 * | 4/2011 | Chowdhury et al. | 429/429 |

\* cited by examiner

*Primary Examiner* — Stephen J. Kalafut
(74) *Attorney, Agent, or Firm* — Dinsmore & Shohl LLP

(57) ABSTRACT

A remedial method for starting a fuel cell system is described. The method includes determining if the remedial method is required; providing air to an exhaust of a fuel cell stack; setting a hydrogen flow rate to an anode side of the fuel cell stack; providing a predetermined volume of hydrogen to the anode side of the fuel cell at the hydrogen flow rate; providing a predetermined volume of air to a cathode side of the fuel cell stack after the predetermined volume of hydrogen has been provided to the anode side while continuing to provide air to the exhaust of the fuel cell stack and hydrogen to the anode side of the fuel cell stack; determining if a stack voltage is stable after the predetermined volume of air has been provided to the cathode side; and closing the anode outlet valve after the stack voltage is stable.

23 Claims, 4 Drawing Sheets

U.S. 8,367,260 B2

1
REMEDIAL START METHOD IN A FUEL CELL

BACKGROUND

This invention relates generally to fuel cells, and more particularly to methods of fuel cell system start-up.

Starting a fuel cell system for automotive applications involves a balance between reliability, durability, and time until acceptable drive away (start length). Reliability involves ensuring that sufficient reactant is present across the whole active area on both sides of the membrane so that full current can be supported This must be done without exceeding the hydrogen emission requirements. Factors such as hardware layout, hardware reliability, or various ambient conditions, such as temperature, pressure, and humidity, also impact the strategy used to start a fuel cell system successfully.

Durability involves proper mitigation of the Air/$H_2$ front on the anode. Correlations between Air/$H_2$ front speed through the cell and cell degradation have been identified. In order to reduce the effect of cell degradation, the front speed must be increased. However, in automotive applications, increasing the front speed is limited by the hydrogen emission requirements and available dilution air as provided by the compressor.

In all cases, it is desirable to reduce the start length for customer satisfaction. Again, this is limited by the hydrogen emission requirements and the ability to supply reactant fully and uniformly to the stack active area due to its non-uniform flow characteristics.

In a normal start, concern for reliability, durability, and start length are about the same. In a typical start strategy, the initial gas composition within the system is required as an input to the controls so that the system can decide on the most optimized method to start.

FIGS. 1-2 illustrate one embodiment of a fuel cell system and a normal start-up method. The system and method are described more fully in U.S. application Ser. No. 11/859,300, filed Sep. 21, 2007, entitled Method for Fast and Reliable Fuel Cell Systems Start-ups, which is incorporated herein by reference. Many other embodiments are possible.

FIG. 1 shows a fuel cell system 10 including a first split fuel cell stack 12 and a second split fuel cell stack 14. A compressor 16 provides cathode input air on cathode input line 18 to the stacks 12 and 14 through a normally closed cathode input valve 20. Cathode exhaust gas is output from the split stack 12 on line 24, and cathode exhaust gas is output from the split stack 14 on line 26 where the cathode exhaust gas is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally closed by-pass valve 34 controls whether the cathode air by-passes the stacks 12 and 14. If the valves 20 and 30 are closed and the valve 34 is open, air from the compressor 16 will by-pass the stacks 12 and 14. Typically, a cathode humidification unit (not shown) will be provided at a suitable location in the cathode input line 18.

In this arrangement, the stacks 12 and 14 employ anode flow-shifting where the anode reactant gas flows back and forth through the stacks 12 and 14 at a predetermined cycle in a manner that is well understood to those skilled in the art. An injector 38 injects hydrogen gas from a hydrogen gas source 40 through anode line 42 to the split stack 12, and an injector 44 injects hydrogen gas from the hydrogen source 40 through anode line 48 to the split stack 14 in an alternating sequence.

2
A connector line 54 connects the anode sides of the stacks 12 and 14.

A water separator 60 is coupled to the connector line 54 and collects water in the anode gas flow between the stacks 12 and 14. A normally closed drain valve 62 can be employed that is periodically opened to vent the water to the cathode exhaust gas line 28 on line 64. Further, an anode exhaust gas purge valve 66 can be provided in the connection line 54.

As discussed above, it is desirable to bleed the anode side of the stacks 12 and 14 periodically to remove nitrogen that may otherwise dilute the hydrogen and affect cell performance. Normally closed bleed valves 50 and 52 are provided for this purpose. When an anode bleed is commanded, the bleed valve 50 or 52 is opened, and the bled anode exhaust gas is sent to the cathode exhaust gas line 28 depending on which direction the hydrogen gas is currently flowing. Particularly, if the hydrogen gas is being injected into the split stack 12 from the source 40 when a bleed is triggered, then the bleed valve 52 is opened. Likewise, if the hydrogen gas is being injected into the split stack 14 from the source 40 when a bleed is triggered, then the bleed valve 50 is opened. The flow-shifting will typically occur several times during a normal bleed duration so that the bleed valves 50 and 52 have to be opened and closed several times in time with the flow switching.

The fuel cell stacks 12 and 14 generate current. During normal stack operation, the current generated by the stacks 12 and 14 is used to drive system loads, such as an electrical traction system (ETS) 56 on a vehicle. During a shut-down sequence, the current generated by the stacks 12 and 14 may be used to charge a battery 58, or be dissipated by other system components, and then be dissipated by a resistor 68.

At one system shut-down sequence, the compressor 16 is stopped, and the valves 20 and 30 are closed to seal the cathode side of the stacks 12 and 14. The flow of hydrogen is continued so that any remaining oxygen in the stacks 12 and 14 is consumed. The current generated by the stacks 12 and 14 is sent to the battery 58. When the stack power decreases to another predetermined level, the contactors are opened, and the stack load is switched to the resistor 68. Particularly, once the voltage has degraded to a fixed cut-off voltage, the stack load is switched to the resistor 68. The cut-off voltage could be the lower limit of a DC/DC converter (not shown), or the lower limit of a power device. The objective of the battery load is to consume and/or store any energy that otherwise would have been wasted. It also reduces the energy consumption requirements of the resistor load.

Once the oxygen has been consumed from the stacks 12 and 14, the hydrogen flow is turned off, and the valves 50, 52, 62 and 66 are closed to seal the anode side of the stacks 12 and 14. When the system 10 is shut-down in this manner, the stacks 12 and 14 include an $N_2/H_2$ mixture in both the cathode side and the anode side. Over time, air will leak into the stacks 12 and 14, and the hydrogen in the stacks 12 and 14 will initially consume the oxygen. Additionally, the hydrogen will slowly leak out of the stacks 12 and 14. As a result, the composition of the gases within the stacks 12 and 14 will vary over time between a hydrogen rich mixture in nitrogen and water to an air mixture.

The amount of hydrogen that is used at startup to purge the stacks 12 and 14 can be calculated based on the volume of the anode side of the stacks 12 and 14, the temperature of the stacks 12 and 14, and the pressure within the stacks 12 and 14. The hydrogen flow into the stacks 12 and 14 should be roughly one anode volume. If an insufficient amount of hydrogen flows into the stack, some of the fuel cells might be left containing an $H_2/O_2$ front. If too much hydrogen flows into the first stack, excess hydrogen is wasted to the exhaust and might enter into the second stack through compression, leading to a stagnant hydrogen/air front causing excessive voltage degradation. The loop volume for each of the stacks 12 and 14 is calculated and this information is combined with the hydrogen flow rate during the start-up to determine the purge time for the first stack.

FIGS. 2A-B is a flow chart diagram 70 showing a method for starting the fuel cell system 10 quickly and reliably, especially during cold starts. At box 72, the compressor 16 is started for hydrogen output dilution purposes. The initial part of the system start-up includes starting the compressor 16 to provide dilution air for hydrogen that collects in the exhaust as a result of the start-up sequence. The algorithm then determines whether the stacks 12 and 14 are filled with air at decision diamond 74 as a result of the time they have been shut-down, and if so, initiates a flush of the anode headers using a header purge at box 76. This provides a technique for removing air and nitrogen from the header of both of the stacks 12 and 14 prior to the stack flush. After the header has been purged, the stack flush provides a large flow rate of hydrogen gas through the anode flow fields to minimize start-up degradation due to the hydrogen/air front, as discussed above.

The algorithm then continues the anode flow by opening the drain valve 62 to the stacks 12 and 14 simultaneously to continue filling the anode header with hydrogen gas at box 78. In this flow process, both of the injectors 38 and 44 are used at the same time to flow hydrogen gas evenly through the stacks 12 and 14. All large valves are closed at this stage to allow for a well controlled, low flow rate hydrogen injection. The valves that are open typically have a small orifice. Alternatively, large valves can be used that are pulse width modulated to provide effectively a small valve. The hydrogen injectors 38 and 44 are typically controlled based on the anode outlet pressure of the stacks 12 and 14. However, in this case, the injectors 38 and 44 will switch modes to flow control where the flow will be metered so that it is as high as possible without causing exhaust emissions to exceed a predetermined hydrogen concentration when mixed with the cathode exhaust. Therefore, the hydrogen flow rate would be varied in real time based on cathode dilution flow.

If the stack is not filled with air at the decision diamond 74, then the algorithm skips the stack flush step at the box 76, and proceeds directly to the step of providing the anode flow at the box 78.

At the same time, there should be a peak anode pressure to limit the injector flow 38 and 44. In other words, the cathode exhaust flow rate needs to be known, and the anode flow rate will be estimated based on the injector duty cycle. The injectors 38 and 44 should be controlled so as to generate as high a flow as possible to produce emissions less than the predetermined threshold, and so that anode pressures do not exceed a predetermined pressure, such as 150 kPa. The duration of this flow is determined based on a function that takes the time since the last shut-down as the input, and outputs a minimum number of anode volumes of hydrogen gas that should be flowed.

The algorithm then determines whether this is the first time through the start loop and the anode side flush was performed at decision diamond 80. If both of these conditions are met, then the algorithm by-passes the cathode air around the stacks 12 and 14 for some duration of the anode flow, such as half, at box 82. When by-passing the cathode air around the stacks 12 and 14, additional air is not added to the cathode side that may permeate through the membranes. In other words, it is desirable to fill the anode side completely with hydrogen before air is introduced into the cathode side so that hydrogen permeates through the membrane instead of air, reducing the hydrogen/air front on the anode side of the stacks 12 and 14.

Once the cathode air has by-passed the stacks 12 and 14 for the predetermined anode volume flow, the algorithm then flows the cathode air through the stacks 12 and 14 for the remainder of the anode flow at box 84. If this is not the first time through the control loop or the stack flush did not occur at the box 76, then the algorithm proceeds directly to flowing the cathode air through the stacks 12 and 14 at box 86.

Next, the algorithm continues with the anode flow and engages the pull-down resistor 68 coupled to the stacks 12 and 14 as a load at box 88 until one of two conditions is met, namely, that the minimum cell voltage is greater than a predetermined voltage value, such as 700 mV, or a predetermined period of time has elapsed, such as 10 seconds. By putting a load on the stacks 12 and 14, a voltage drop occurs across the stacks 12 and 14 that more nearly matches the high voltage bus line (not shown) coupled to the high voltage battery 58 in the system 10. Particularly, the algorithm uses a stack voltage response to apply a load to assess if hydrogen and oxygen are being sufficiently distributed to all of the fuel cells by coupling an auxiliary load to the fuel cell stack. This step is one of the ways that the algorithm provides a fast and reliable start-up by making sure that the minimum cell voltage is high enough or enough hydrogen is in the anode flow channels so that the operation of the stacks 12 and 14 is stable. If the stacks 12 and 14 are healthy, and no problems exist, then the algorithm will proceed very quickly through these steps of the control loop. However, if the stacks 12 and 14 have significantly aged, or degraded for some other reason, then the time period that the algorithm waits during the start-up sequence will provide a better situation for the stacks 12 and 14 to start in a stable manner.

Once the minimum cell voltage is greater than the predetermined voltage value or the predetermined time period has expired, the algorithm then closes the stack contactors to the high voltage bus line at box 90 to allow the stacks 12 and 14 to operate under the normal loads of the system 10. The algorithm then loads the stacks 12 and 14 at box 92 with as many of the fuel cell system components as it can up to the maximum limit of the stacks 12 and 14 for a predetermined period of time, such as seven seconds, to test the stacks 12 and 14 and see if they will operate normally.

The algorithm then determines whether the minimum cell voltage has dropped to a predetermined voltage, such as 400 mV, at decision diamond 94. If the minimum cell voltage in either of the stacks 12 or 14 is below the predetermined voltage, then the reliability of the start-up is reduced. The algorithm then proceeds to minimize the maximum power allowed to be drawn from the stacks 12 and 14 at box 96 in an attempt to try and raise the minimum cell voltage above the predetermined value.

The algorithm also determines whether the minimum cell voltage has dropped below another lower predetermined voltage, such as 200 mV, or the minimum cell voltage drop rate is exceeding a predetermined voltage drop rate, such as 1000 mV/sec, at decision diamond 98. If neither of these two conditions is met, then the algorithm returns to the box 92 to give the stacks 12 and 14 another attempt to raise their minimum cell voltage above the first predetermined voltage value.

If the minimum cell voltage is not less than the first predetermined voltage value at the decision diamond 94, then the split stack 12 or 14 may be operating properly. The algorithm then determines whether the maximum power allowed from the stacks 12 and 14 is less than a predetermined value, such as 90 kW, at decision diamond 100. If the maximum stack power is below the predetermined value, then the stacks 12 and 14 have not raised their maximum power output quickly enough during the start-up sequence, meaning that the stacks 12 and/or 14 may be unstable.

If the minimum cell voltage is less than the second predetermined voltage value or the minimum cell voltage drop rate is greater than the predetermined voltage drop rate at the decision diamond 98, or the stacks 12 and 14 have not reached the maximum power allowed at the decision diamond 100, then the algorithm determines whether the battery 58 can support another loop through the start-up sequence at decision diamond 102. If there is sufficient battery power and the number of iterations through the loop has been less than a predetermined value, such as eight, then the stack contactors are opened at box 104. Further, the algorithm limits the maximum power draw from the battery 58 to some predetermined maximum value, such as 20 kW, or to the maximum battery power available, whichever is smaller, at box 106. The algorithm then proceeds to the step of providing the anode flow to the stacks 12 and 14 at the box 78, where the answer to whether this is the first time through the loop at the decision diamond 80 will be no, increasing the number of performed iterations through the loop.

If the battery 58 cannot support another iteration through the loop or the maximum number of iterations through the loop has been reached at the decision diamond 102, then the system 10 is put in a reduced performance mode at box 108 that allows the vehicle to operate, but with limited power, so that it can be driven to a service station or other safe location.

If the maximum power allowed is greater than the predetermined value at the decision diamond 100, then the algorithm modifies the look-up table that identifies how many anode volumes of hydrogen have been flowed into the anode flow field at box 110. If the amount of anode flow needed is higher, then the table is updated permanently in the software for the system. In this way, the start time may be extended in the future for the new times since the last shut-down, but the reliability of the system is improved. Essentially, the table will adapt as the stack ages. Once the table is updated, the algorithm will go to full system operation and begin anode flow-shifting at box 112.

While a normal start-up method works well most of the time, in some situations the initial gas concentration is not known. For example, the previous shut-down may not have been completed properly, a start may have failed, or the system may have lost the battery voltage. In that case, the initial gas concentration may not be known, which can cause problems with the fuel cell start-up process.

Therefore, there is a need for a start-up method under non-standard conditions which provides good reliability while not exceeding emissions requirements.

SUMMARY OF THE INVENTION

The remedial method for starting a fuel cell system meets these needs. In one embodiment, the method includes determining if the remedial method is required; providing air to an exhaust of a fuel cell stack; setting a hydrogen flow rate to an anode side of the fuel cell stack; providing a predetermined volume of hydrogen to the anode side of the fuel cell at the hydrogen flow rate; providing a predetermined volume of air to a cathode side of the fuel cell stack after the predetermined volume of hydrogen has been provided to the anode side while continuing to provide air to the exhaust of the fuel cell stack and hydrogen to the anode side of the fuel cell stack; determining if a stack voltage is stable after the predetermined volume of air has been provided to the cathode side; and closing the anode outlet valve after the stack voltage is stable.

DETAILED DESCRIPTION OF THE INVENTION

Figure 1:
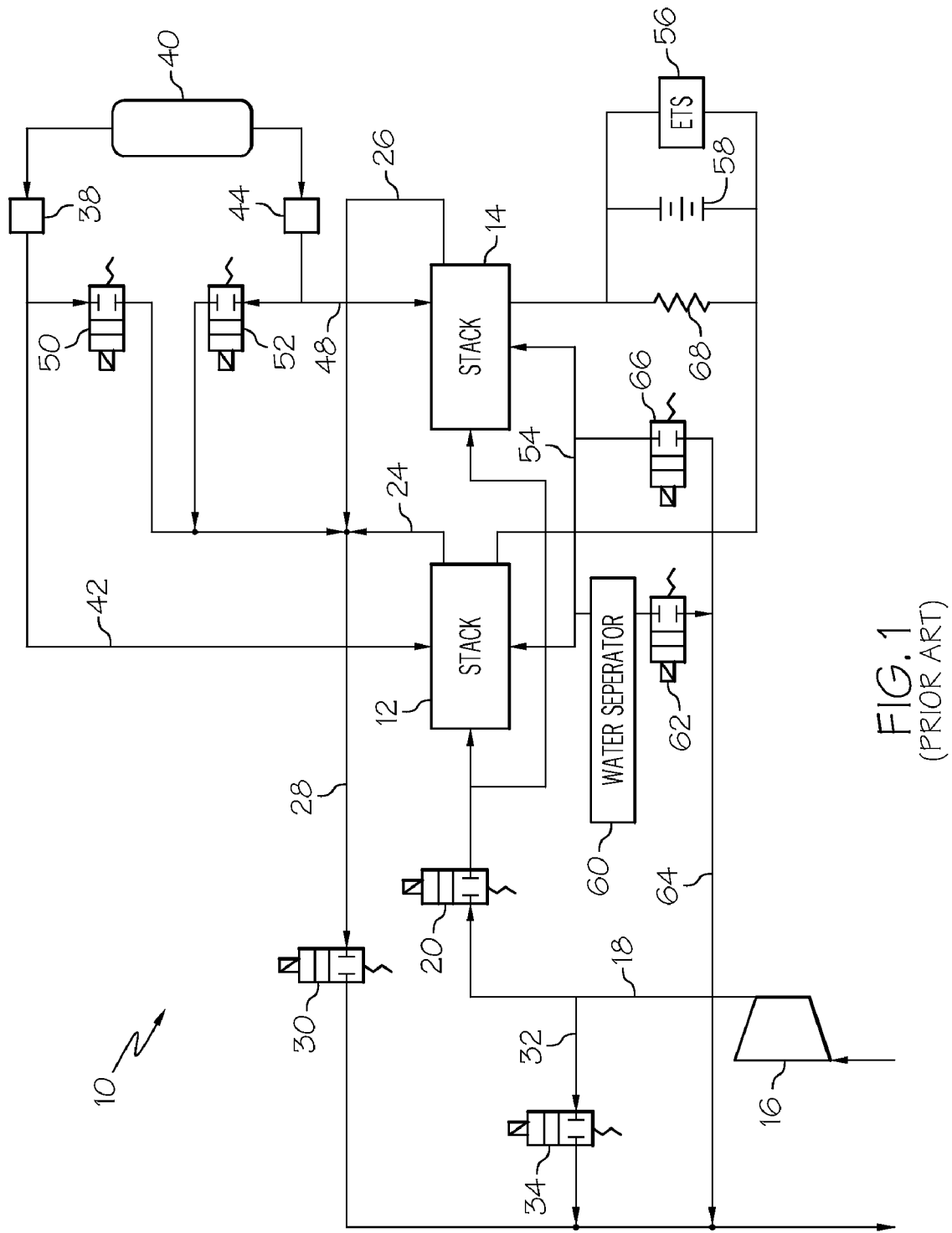
FIG. 1 is a schematic block diagram of a fuel cell.

The remedial start can be initiated under several conditions. It can be used when the fuel cell system was subject to a quick stop or a failed start attempt, or when the system lost battery voltage. In these situations, the gas concentration in the fuel cell may not be known, which can cause problems in starting the fuel cell. If there is more hydrogen in the anode than is expected by the system, it could result in a violation of the exhaust hydrogen emissions limit. If there is less hydrogen in the system than is expected, the hydrogen will be consumed more quickly than predicted, which can lead to a low performing cell.

In order to address these problems, a remedial start procedure can be used rather than the normal start procedure. The remedial start mode places high importance on start reliability, and less importance on durability and start length.

The anode is controlled based on the assumption that the anode subsystem is filled with hydrogen from an emissions perspective and air from a needed hydrogen perspective. These assumptions are needed when the actual gas composition is unknown. It leads to low flush and fill rates for emissions control. Long flush and fill times are needed to purge air from the stack fully and to fill the anode flow fields with reactant. It requires an anode valve with relatively small kV for controllability.

The cathode is controlled based on the assumption that the cathode is filled with hydrogen. Air is introduced slowly into the cathode so that hydrogen is not forced into the exhaust quickly.

The compressor is controlled based on a high flow rate so that sufficient bypass flow is available for dilution throughout the start sequence.

No hydrogen is purged from the system (either the anode or the cathode) until the compressor has finished its spool up to meet its set point.

The system can use a valve with a low flow resistance coefficient so that, given a constant flow of 100% hydrogen through the valve, there should be enough dilution air available not to exceed the maximum exhaust concentration (e.g., for dilution air flow rate of 80 g/s, and a valve flow of 0.12 mol/s hydrogen, the maximum kV should be less than 0.389).

The remedial start procedure has several disadvantages. One disadvantage of performing a remedial start with an air filled stack is increased cell degradation compared with a normal start. However, remedial starts are intended to have a low occurrence rate; consequently, they should not have a significant impact on stack life over the life of the system. Another disadvantage is that the system will generally take longer to start than the normal start sequence. Finally, the remedial start is inefficient in the use of hydrogen compared to a normal start sequence.

These disadvantages are outweighed by the improved start reliability and improved emissions control under non-standard conditions. The remedial start mode provides the ability to start the fuel cell system reliably if the gas concentration is not known just prior to the start request. It ensures a prolonged anode flush and fill and cathode air fill. It also allows the ability to start the fuel cell system reliably if the battery voltage was removed, resulting in the inability to predict the gas concentration at time of start. The longer start lengths required for a remedial strategy result in higher cell stability, and improved emissions control.

Figure 2A:
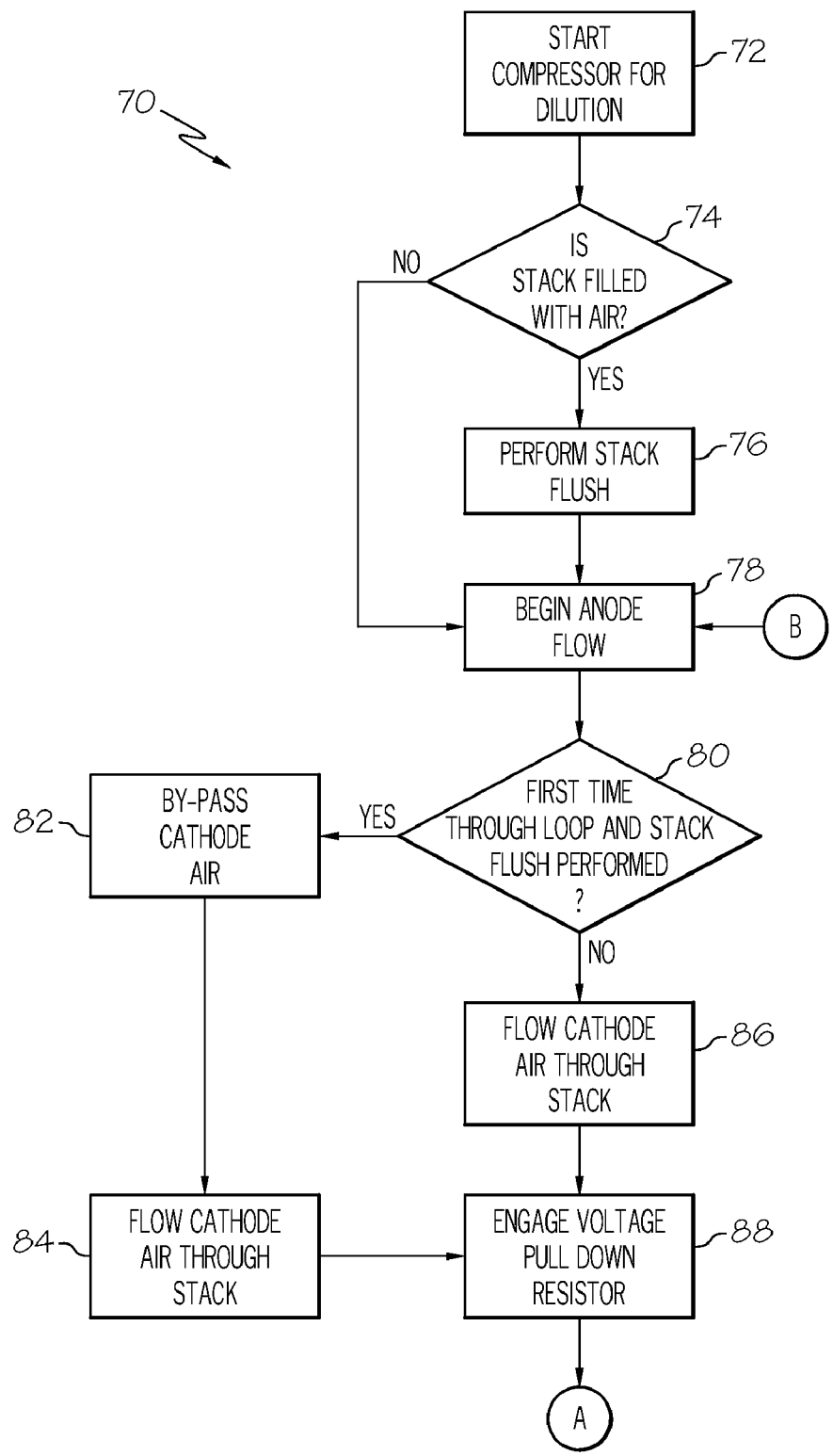
FIGS. 2A-B are flow chart diagrams showing a process for providing a normal fuel cell start-up.
Figure 2B:
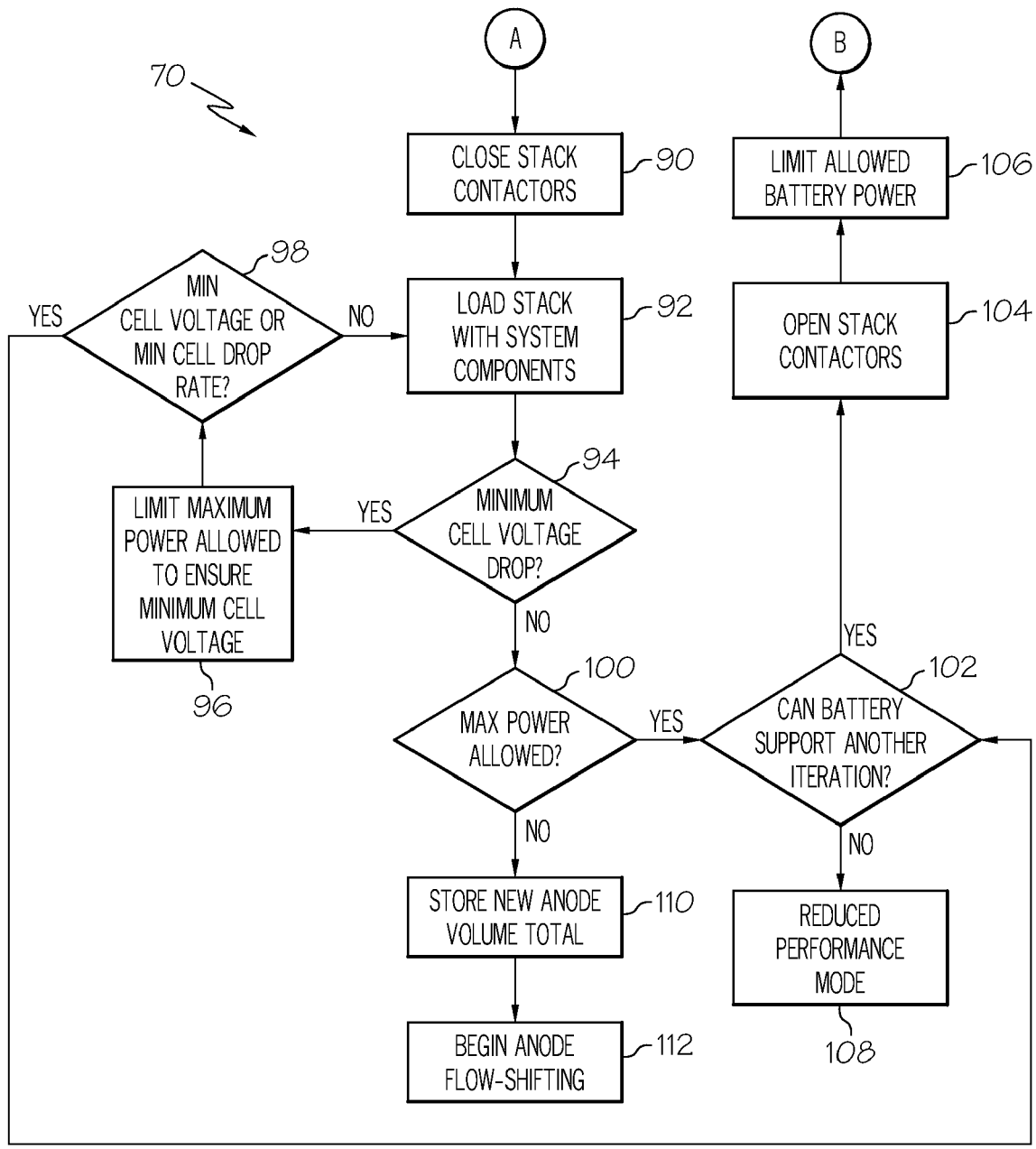

The main distinction between a normal start sequence and a remedial start sequence is that in the remedial start strategy, certain start functions are disabled. A normal start sequence may call upon functions such as Header Purge, Fast Flush, Anode Fill, and Voltage Stabilization or some lesser variation thereof for anode side functions, as shown in FIG. 2, for example. The use of the Header Purge and Fast Flush functions typically reduce cell degradation and start length with acceptable cell stability. The Header Purge function is one in which the anode header is purged to bring the hydrogen concentration in those channels to that of pure hydrogen. The Fast Flush function is one in which a high flow rate through the anode is utilized to raise the hydrogen concentration in the anode flow channels as quickly as possible without exceeding the emissions limits. This is accomplished using a valve 66 with a high $k_v$.

In contrast, the remedial start relies on Anode Fill, and Voltage Stabilization. Anode Fill function is a slower fill of the anode which is used when the anode contains or is assumed to contain a threshold level of hydrogen. A slow fill is needed in this case so that emissions requirements are not violated. This is accomplished using a smaller valve such as drain valve 62. The Voltage Stabilization function is an operation with both anode and cathode flow and with cell voltage checks (particularly with some load applied to the stack) to check that all cells have fuel and air based on the level and uniformity of the cell voltages. This is done before allowing higher levels of driving loads to ensure proper stack performance.

The Cathode Fill function occurs for both types of start modes; however, different calibration sets would be used.

The exclusion of Header Purge and Fast Flush functions in a remedial start is based on two assumptions used for the remedial start. The first assumption, which relates to emissions control for a corrupted value of initial gas composition, is that the value is 100% hydrogen concentration for both the anode and cathode. The second assumption, which relates to cell stability and start reliability for a corrupted initial gas composition at the time of a start request, is that the value is 0% initial hydrogen gas composition on the anode and 100% initial hydrogen gas composition on the cathode.

Controlling based on both assumptions at the same time for a remedial start requires a low anode flow combined with an extended flush/fill time. To achieve a low anode flow that is controllable and realistic, the anode valve must have a relatively low valve flow coefficient (kV). On the fuel cell system shown in FIG. 1, this valve is the drain valve 62 which is located between both sub-stacks 12 and 14. The size of the Header Purge valves (not shown) and Flush valve 66 are at least 75% larger than the drain valve; consequently, they cannot be used given the assumptions. To deal with hydrogen on the cathode, the dilution flow is maximized, and the Cathode Fill function will minimize air flow into the cathode based on a flow split function to reduce the rate at which hydrogen is pushed from the cathode into the exhaust. Flow split is the ratio of air flow to the cathode to the bypass flow. This is controlled by the relative positions of the backpressure valve 30 and the bypass valve 34. By having the bypass valve 34 fully open and the backpressure valve 30 partially open most of the air will bypass the stack and flow directly to the exhaust for dilution and a smaller air flow through the stack will displace hydrogen from the cathode.

Figure 3A:
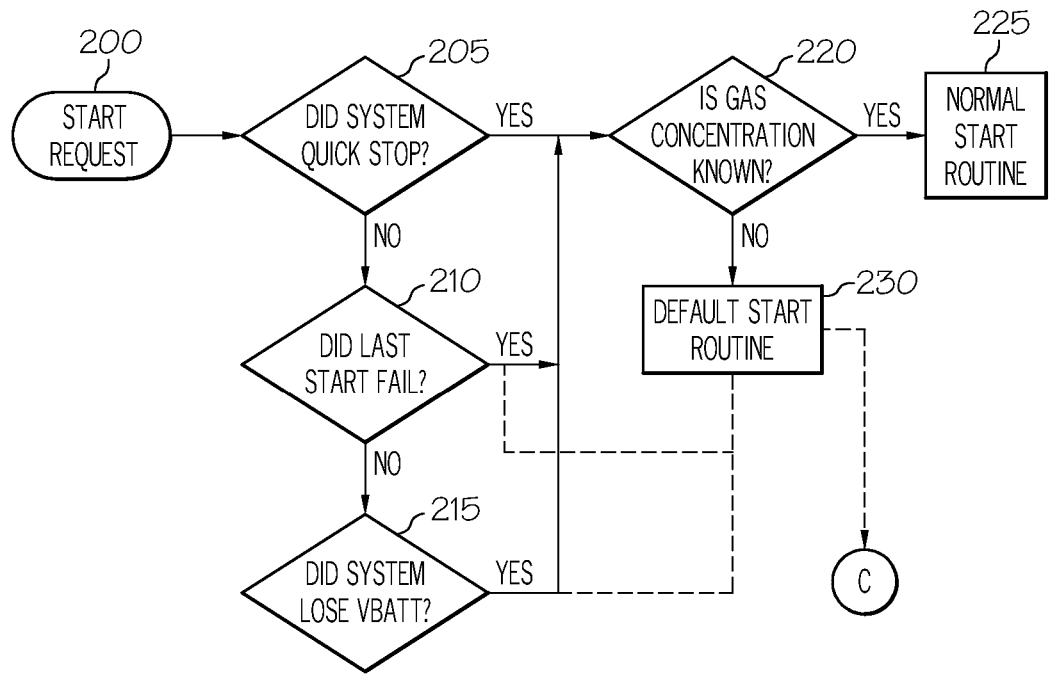
FIGS. 3A-B are flow chart diagrams showing a process for providing a remedial fuel cell start-up.
Figure 3B:
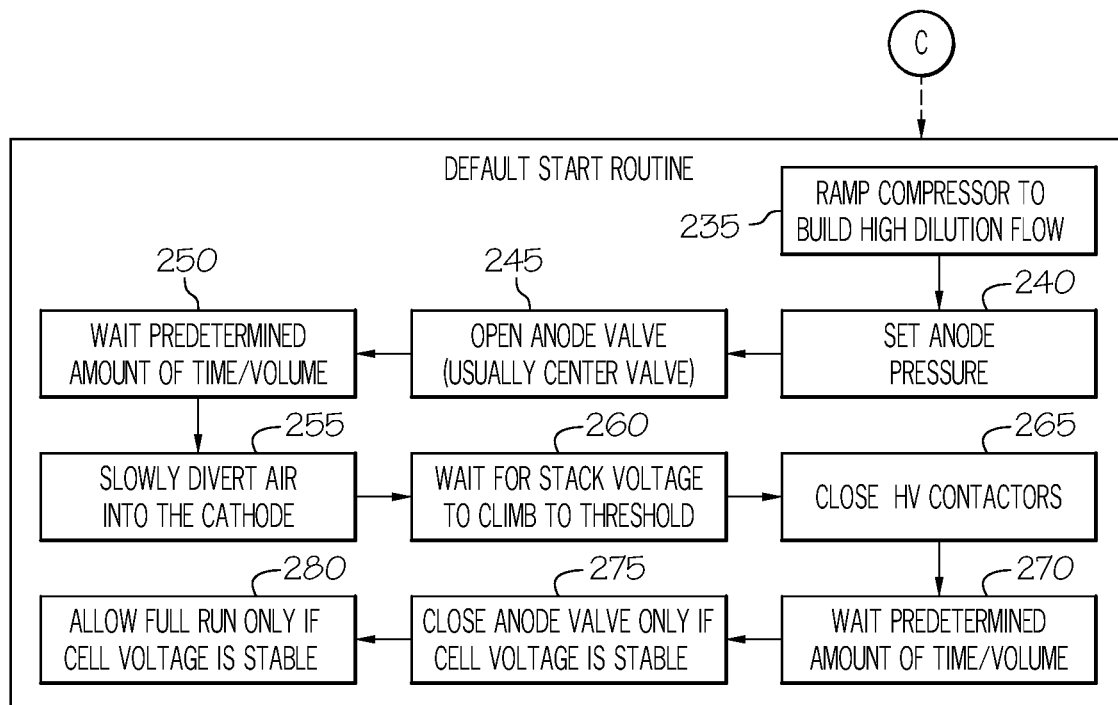

FIGS. 3A-B are flow chart diagrams showing one embodiment of the remedial start sequence 230. A start request is initiated at block 200. A determination of whether the remedial start mode is needed is made at blocks 205, 210, 215, and 220. Block 205 asks whether the system had a quick stop. Block 210 asks whether the last start failed. Block 215 asks whether the system lost battery voltage. If the answers to any of the questions are yes, block 220 asks whether the gas concentration is known. If the gas concentration is known, the normal start routine 225 can be used. However, if the gas concentration is not known, then the remedial start routine 230 is used as shown in FIG. 3B.

Alternatively, if the answer to any of the questions in blocks 205, 210, or 215 is yes, the remedial start routine 230 can be used without asking whether the gas concentration is known.

In block 235, with the cathode in full bypass, the compressor 16 is to spool in order to generate a high flow rate of air needed for dilution. In full bypass, bypass valve 34 is fully open and cathode inlet valve 20 closed and/or cathode backpressure valve 30 closed.

In block 240, the hydrogen flow rate is set using anode to cathode delta pressure, and is controlled to an exhaust hydrogen emissions target based on the following sets of equations:

A 100% anode hydrogen concentration is assumed.

$$\dot{n}_{H_2}^{Vlv} = \frac{Y_{H_2}^{Exh} \dot{n}_{Air}^{Exh}}{1 - Y_{H_2}^{Exh}}$$

where,
$\dot{n}_{H_2}^{Vlv}$ is desired hydrogen flow through valve
$Y_{H_2}^{Exh}$ is the target exhaust concentration
$\dot{n}_{Air}^{Exh}$ is the available air flow for dilution in the exhaust $$P_{An} = \sqrt{\left[\left(\frac{\dot{n}_{H_2}^{Vlv} * 4.633}{K_v}\right)^2 * MW * T + P_{Exh}^2\right]}$$

where,
$P_{An}$ is the anode pressure set point
$\dot{n}_{H_2}^{Vlv}$ is the desired hydrogen flow as previously calculated
$K_v$ is the equivalent valve flow coefficient
MW is the molecular weight of hydrogen
T is the gas temperature
$P_{Exh}$ is the exhaust (downstream) pressure Once the anode pressure set point is achieved, the anode valve 62 can be opened allowing hydrogen flow to occur at block 245. After a predetermined volume of hydrogen has been supplied to the anode 250, air is slowly diverted into the cathode at block 255. The predetermined volume of hydrogen is based on the amount of hydrogen needed to fill the anode. The physical requirement is for the hydrogen volume flow to fill the anode volume. The predetermined anode volume is generally between about 1 and about 3 anode volumes. For simplicity of control, a calibrated time based on the length of time needed for the needed volume to flow through the anode may be used. This time would be dependent on the system size and flow rate.

A high bypass ratio is used to ensure that any hydrogen displaced from the cathode is adequately diluted. The appropriate bypass ratio (i.e., the amount of air provided to the cathode side of the fuel cell to the amount of air provided to the exhaust of the fuel cell) is based on the estimated concentration of hydrogen in the cathode at startup and the emissions target. For example, if the cathode is assumed to contain 100% hydrogen, the maximum bypass ratio would be about 4% to meet a 4% emissions target. It is generally less than about 0.10, typically in the range of about 0.04 to about 0.08, typically about 0.05.

The system will continue to flow hydrogen through the anode and air through the cathode until an acceptable stack voltage is observed at block 260. The acceptable stack voltage is based on the needs of the high voltage system. The high voltage bus contactors are then closed at block 265. The high voltage bus connectors are electrical disconnects to isolate or connect the stack to the high voltage electric power lines. The connectors were opened during shutdown to isolate the stack from the high voltage bus for safety reasons while the vehicle is off.

After a predetermined volume of air has been supplied to the cathode (or a corresponding calibrated time) at block 270 following the closing of the contactors, the cell voltage is checked to determine if the system is stable, i.e., whether there are any low cell voltages. When the cell voltage is stable, the anode valve 62 is closed at block 275. The predetermined cathode volume is generally in the range of about 1 to about 3 cathode volumes. Alternatively, the contactors could be closed before the stack voltage is measured.

The system will transition into normal run if the cell voltage remains stable at block 280. Stability is determined by monitoring the cell voltages, particularly as the load is applied. If the cell voltage is not stable, the system will continue to feed hydrogen into the anode and air into the cathode until the cell voltages stabilize. Suitable cell voltages are generally in the range of about 600 mV to about 900 mV or about 600 mV to about 800 mV, or about 750 mV to about 900 mV.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A remedial method for starting a fuel cell system comprising:
    determining if the remedial method is required;
    providing air to an exhaust of a fuel cell stack;
    setting a hydrogen flow rate to an anode side of the fuel cell stack;
    providing a predetermined volume of hydrogen to the anode side of the fuel cell at the hydrogen flow rate;
    providing a predetermined volume of air to a cathode side of the fuel cell stack after the predetermined volume of hydrogen has been provided to the anode side while continuing to provide air to the exhaust of the fuel cell stack and hydrogen to the anode side of the fuel cell stack;
    determining if a stack voltage is stable after the predetermined volume of air has been provided to the cathode side; and
    closing an anode outlet valve after the stack voltage is stable.

2. The method of claim 1 wherein the hydrogen flow rate is set using an anode to cathode exhaust pressure difference.

3. The method of claim 2 wherein the hydrogen flow rate is controlled to a hydrogen emissions exhaust target.

4. The method of claim 1 wherein the hydrogen flow rate is set using the following equations:

$$\dot{n}_{H_2}^{Vlv} = \frac{Y_{H_2}^{Exh} \dot{n}_{Air}^{Exh}}{1 - Y_{H_2}^{Exh}}$$

where,
   $\dot{n}_{H_2}^{Vlv}$ is desired hydrogen flow through an anode outlet valve
   $Y_{H_2}^{Exh}$ is the target exhaust hydrogen concentration
   $\dot{n}_{Air}^{Exh}$ is the available air flow for dilution in the exhaust $$P_{An} = \sqrt{\left[\left(\frac{\dot{n}_{H_2}^{Vlv} * 4.633}{K_v}\right)^2 * MW * T + P_{Exh}^2\right]}$$

where,
   $P_{An}$ is the anode pressure set point
   $\dot{n}H_2^{Vlv}$ is the desired hydrogen flow as previously calculated
   $K_v$ is the equivalent valve flow coefficient
   MW is the molecular weight of hydrogen
   T is the the gas temperature
   $P_{Exh}$ is the exhaust (downstream) pressure.

5. The method of claim 1 wherein the hydrogen is provided to the anode side of the fuel cell stack by opening a hydrogen supply valve and an anode outlet valve.

6. The method of claim 1 wherein determining if the remedial method is required comprises determining whether the fuel cell system suffered a quick stop, a failed start, or a lost battery voltage.

7. The method of claim 1 wherein the predetermined volume of hydrogen is in a range of about 1 to about 3 anode volumes.

8. The method of claim 1 wherein the predetermined volume of air is in a range of about 1 to about 3 cathode volumes.

9. The method of claim 1 wherein the predetermined stack voltage is in a range of about 600 mV to about 900 mV per cell.

10. The method of claim 1 wherein a ratio of an amount of air provided to the cathode side of the fuel cell to an amount of air provided the exhaust of the fuel cell is less than about 10%.

11. The method of claim 1 further comprising closing a high voltage contactor after introducing air to the cathode side of the fuel cell stack when a predetermined stack voltage is obtained.

12. The method of claim 1 further comprising closing a high voltage contactor before determining the stack voltage.

13. The remedial method of claim 1, wherein the anode outlet valve is selected from a drain valve, an exhaust purge valve, and a back pressure valve.

14. The remedial method of claim 4, wherein $\dot{n}_{H_2}^{Vlv}$ is the desired hydrogen flow through a drain valve, an exhaust purge valve, or a back pressure valve.

15. A remedial method for starting a fuel cell system comprising:
determining if the remedial method is required;
providing air to an exhaust of a fuel cell stack;
setting a hydrogen flow rate to an anode side of the fuel cell stack using the following equations:

$$\dot{n}_{H_2}^{Vlv} = \frac{Y_{H_2}^{Exh} \dot{n}_{Air}^{Exh}}{1 - Y_{H_2}^{Exh}}$$

where,
$\dot{n}_{H_2}^{Vlv}$ is desired hydrogen flow through an anode outlet valve
$Y_{H_2}^{Exh}$ is the target exhaust hydrogen concentration
$\dot{n}_{Air}^{Exh}$ is the available air flow for dilution in the exhaust $$P_{An} = \sqrt{\left[\left(\frac{\dot{n}_{H_2}^{Vlv} * 4.633}{K_v}\right)^2 * MW * T + P_{Exh}^2\right]}$$

where,
$P_{An}$ is the anode pressure set point
$\dot{n}_{H_2}^{Vlv}$ is the desired hydrogen flow as previously calculated
$K_v$ is the equivalent valve flow coefficient
MW is the molecular weight of hydrogen
T is the gas temperature
$P_{Exh}$ is the exhaust (downstream) pressure;

providing a predetermined volume of hydrogen to the anode side of the fuel cell at the hydrogen flow rate;
providing a predetermined volume of air to a cathode side of the fuel cell stack after the predetermined volume of hydrogen has been provided to the anode side while continuing to provide air to the exhaust of the fuel cell stack and hydrogen to the anode side of the fuel cell stack;
determining if the stack voltage is stable after the predetermined volume of air has been provided to the cathode side; and
closing the anode outlet valve after the stack voltage is stable.

16. The method of claim 15 wherein the hydrogen is provided to the anode side of the fuel cell stack by opening a hydrogen supply valve and an anode outlet valve.

17. The method of claim 15 determining if the remedial method is required comprises determining whether the fuel cell system suffered a quick stop, a failed start, or a lost battery voltage.

18. The method of claim 15 wherein the predetermined volume of hydrogen is in a range of about 1 to about 3 anode volumes.

19. The method of claim 15 wherein the predetermined volume of air is in a range of about 1 to about 3 cathode volumes.

20. The method of claim 15 wherein the predetermined stack voltage is in a range of about 600 mV to about 900 mV per cell.

21. The method of claim 15 wherein a ratio of an amount of air provided to the cathode side of the fuel cell to an amount of air provided the exhaust of the fuel cell is less than about 10%.

22. The method of claim 15 further comprising closing a high voltage contactor after introducing air to the cathode side of the fuel cell stack when a predetermined stack voltage is obtained.

23. The remedial method of claim 15, wherein the anode outlet valve is selected from a drain valve, an exhaust purge valve, and a back pressure valve.

* * * * *